(12) United States Patent (10) Patent No.: US 12,269,366 B2
Lee (45) Date of Patent: Apr. 8, 2025

(54) SYSTEM AND METHOD FOR CONTROLLING CHARGING ELECTRICALLY DRIVEN TRANSPORT VEHICLES

(71) Applicants: Hyundai Motor Company, Seoul (KR); Kia Corporation, Seoul (KR)

(72) Inventor: Myoung Jun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 591 days.

(21) Appl. No.: 17/405,538

(22) Filed: Aug. 18, 2021

(65) Prior Publication Data

US 2022/0250502 A1 Aug. 11, 2022

(30) Foreign Application Priority Data

Feb. 10, 2021 (KR) .................. 10-2021-0018787

(51) Int. Cl.
*B60L 53/67* (2019.01)
*B60L 53/14* (2019.01)
*B60L 53/35* (2019.01)
*B60L 53/62* (2019.01)
*B60L 53/66* (2019.01)
*B60L 58/12* (2019.01)

(52) U.S. Cl.
CPC ............ *B60L 53/67* (2019.02); *B60L 53/14* (2019.02); *B60L 53/35* (2019.02); *B60L 53/62* (2019.02); *B60L 53/66* (2019.02); *B60L 58/12* (2019.02)

(58) Field of Classification Search
CPC ........................................... B60L 53/67
USPC ........................................... 320/104
See application file for complete search history.

(56) References Cited

U.S. PATENT DOCUMENTS

| 11,554,683 B2 * | 1/2023 | Cashdollar ............ H02J 7/0013 |
| 2014/0191722 A1 * | 7/2014 | Usuki .................... B60L 53/63 |
| | | 320/109 |
| 2019/0217718 A1 * | 7/2019 | Arregui Torres ....... B60L 53/35 |
| 2021/0331598 A1 * | 10/2021 | Ger ......................... B60L 53/60 |
| 2021/0347267 A1 * | 11/2021 | Erikson ................... B60L 53/65 |

FOREIGN PATENT DOCUMENTS

KR 102113305 B1 5/2020

* cited by examiner

*Primary Examiner* — Edward Tso
*Assistant Examiner* — Ahmad H Omar
(74) *Attorney, Agent, or Firm* — Fox Rothschild LLP

(57) ABSTRACT

A charging control system and method are provided for electrically driven transport vehicles to efficiently perform charging control on electrically driven transport vehicles according to a charging priority, which is determined by a charging system of a hub based on state variables, such as travel schedule information of the electrically driven transport vehicles and the SOC and available energy of batteries thereof. In addition, power distribution between electrically driven transport vehicles is controlled by the charging system of the hub based on the state variables, thereby achieving efficient charging of the batteries of the electrically driven transport vehicles, which travel according to a schedule, and optimization of travel of the vehicles.

10 Claims, 3 Drawing Sheets

SYSTEM AND METHOD FOR CONTROLLING CHARGING ELECTRICALLY DRIVEN TRANSPORT VEHICLES

CROSS-REFERENCE TO RELATED APPLICATION

This application claims under 35 U.S.C. § 119(a) the benefit of priority to Korean Patent Application No. 10-2021-0018787 filed on Feb. 10, 2021, the entire contents of which are incorporated herein by reference.

BACKGROUND

(a) Technical Field

The present disclosure relates to a charging control system and method for electrically driven transport vehicles, and more particularly, to a charging control system and method for electrically driven transport vehicles that efficiently charge batteries of electrically driven transport vehicles that travel according to a schedule.

(b) Background Art

As future means of traffic and transport, vertical take-off and landing (VTOL) aircraft for urban air mobility (UAM) and purpose-built vehicles (PBVs) for purpose-based mobility have recently been researched and developed. An aircraft for UAM may be a type of electrically driven transport vehicle because a motor is driven by the power of a battery in order to rotate a propeller to thus perform vertical take-off/landing and flight. Additionally, a PBV may be a type of electrically driven transport vehicle because a motor is driven by the power of a battery to travel.

To enable electrically driven transport vehicles to travel according to a predetermined schedule, a hub, which is a transfer point for the electrically driven transport vehicles, may be constructed in a predetermined place, like a terminal. The hub may be equipped with a charging system for charging the batteries of electrically driven transport vehicles that travel according to a predetermined schedule, for example, aircraft for UAM and PBVs for purpose-based mobility.

The charging system of the hub may perform charging control based on the state of charge (SOC) and available energy of a battery of an electrically driven transport vehicle and the state of the vehicle. However, if the charging system of the hub performs charging control based only on the SOC and available energy of a battery installed in an electrically driven transport vehicle without considering state variables, such as the travel schedule of the electrically driven transport vehicle, there may occur a problem in which charging of the battery of the electrically driven transport vehicle is delayed when the electrically driven transport vehicle is required to travel immediately or urgently.

The above information disclosed in this section is merely for enhancement of understanding of the background of the invention, and therefore it may contain information that does not form the related art that is already known in this country to a person of ordinary skill in the art.

SUMMARY

The present invention has been made in an effort to solve the above-described problems associated with the related art, and it is an object of the present invention to provide a charging control system and method for electrically driven transport vehicles that are capable of efficiently performing charging control on electrically driven transport vehicles according to a charging priority, which is determined by a charging control device of a hub based on state variables, such as travel schedule information of the electrically driven transport vehicles and the SOC and available energy of batteries thereof.

It is another object of the present invention to provide a charging control system and method for electrically driven transport vehicles in which power distribution between electrically driven transport vehicles is controlled by a charging control device of a hub based on state variables, such as travel schedule information of the electrically driven transport vehicles and the SOC and available energy of batteries thereof, thereby achieving efficient charging of the batteries of the electrically driven transport vehicles, which travel according to a schedule, and optimization of travel of the vehicles.

In one aspect, the present invention provides a charging control system for electrically driven transport vehicles, the charging control system may include a battery and a controller mounted in an electrically driven transport vehicle, a charging control device of a hub to which the electrically driven transport vehicle is docked to charge the battery, and a server configured to store state variable information of the electrically driven transport vehicle, provided from the controller, and to provide the stored state variable information to the charging control device of the hub, wherein the charging control device of the hub determines a charging priority with respect to the electrically driven transport vehicle based on the state variable information of the electrically driven transport vehicle, and performs charging control or power distribution control on the electrically driven transport vehicle according to the determined charging priority.

In an exemplary embodiment, the charging control device may include a docking recognition unit configured to recognize whether the electrically driven transport vehicle has been docked to the hub to charge the battery, a power distribution amount determination unit configured to determine the charging priority with respect to the electrically driven transport vehicle, and a power distribution controller configured to control charging and discharging of the battery of the electrically driven transport vehicle according to the charging priority. In addition, the docking recognition unit may be implemented as a sensor configured to sense whether a charging unit of the electrically driven transport vehicle has been docked to the hub to charge the battery.

The power distribution amount determination unit may be configured to receive at least one of a plurality of pieces of state variable information, including travel schedule information of the electrically driven transport vehicle and information on a state of charge (SOC) and available energy of the battery, stored in the server, and may be configured to compare the plurality of pieces of state variable information with one another to determine the charging priority or a power distribution amount with respect to the electrically driven transport vehicle. In addition, the power distribution controller may be configured to execute charging of the battery of the electrically driven transport vehicle, or adjust distribution of power to the electrically driven transport vehicle according to the charging priority or the power distribution amount determined by the power distribution amount determination unit.

In another aspect, the present invention provides a charging control method for electrically driven transport vehicles, the charging control method including docking an electrically driven transport vehicle to a charging control device of a hub to charge a battery of the electrically driven transport vehicle, transmitting state variable information of the electrically driven transport vehicle to a server from the time of departure to the time of docking to the hub and storing the state variable information in the server, determining, by the charging control device, a charging priority or a power distribution amount with respect to the electrically driven transport vehicle based on the state variable information provided from the server, and performing, by the charging control device, execute charging of the battery of the electrically driven transport vehicle or control of distribution of power to the electrically driven transport vehicle according to the determined charging priority or the determined power distribution amount.

In addition, the state variable information may include travel schedule information including the travel route of the electrically driven transport vehicle, the departure time, the arrival time, and the next scheduled departure time, SOC information of the battery including the SOC of the battery at the time of departure, the SOC of the battery at the time of arrival at the hub, and a change in the SOC of the battery used to travel a predetermined route, and available energy information including available energy consumed to travel and remaining available energy at the time of arrival at the hub.

The server may be configured to store data on the state variable information, and select one representative value using the standard deviation of the data. In addition, the charging control method may further include recognizing, by the charging control device, whether the electrically driven transport vehicle has been docked to the charging control device to charge the battery before the determining the charging priority or the power distribution amount.

The performing of the control of distribution of power to the electrically driven transport vehicle may include determining whether there is a vehicle that does not require charging of a battery, among a plurality of electrically driven transport vehicles, and in response to determining that there is a vehicle that does not require charging of a battery, performing charging control such that a portion of power of the battery of the vehicle that does not require charging of the battery is supplied to a vehicle that most urgently requires charging of a battery via the charging control device.

Further, among the plurality of electrically driven transport vehicles, a vehicle that has a relatively high degree of SOC of a battery and has a relatively long time to the next scheduled trip may be determined to be the vehicle that does not require charging of the battery. When the battery of the vehicle that supplied power to another vehicle via the charging control device is discharged and needs to be charged again, the battery may be charged according to the charging priority.

BRIEF DESCRIPTION OF THE DRAWINGS

The above and other features of the present invention will now be described in detail with reference to exemplary embodiments thereof, illustrated in the accompanying drawings, which are given hereinbelow by way of illustration only, and thus are not limitative of the present invention, and wherein.

Figure 1:
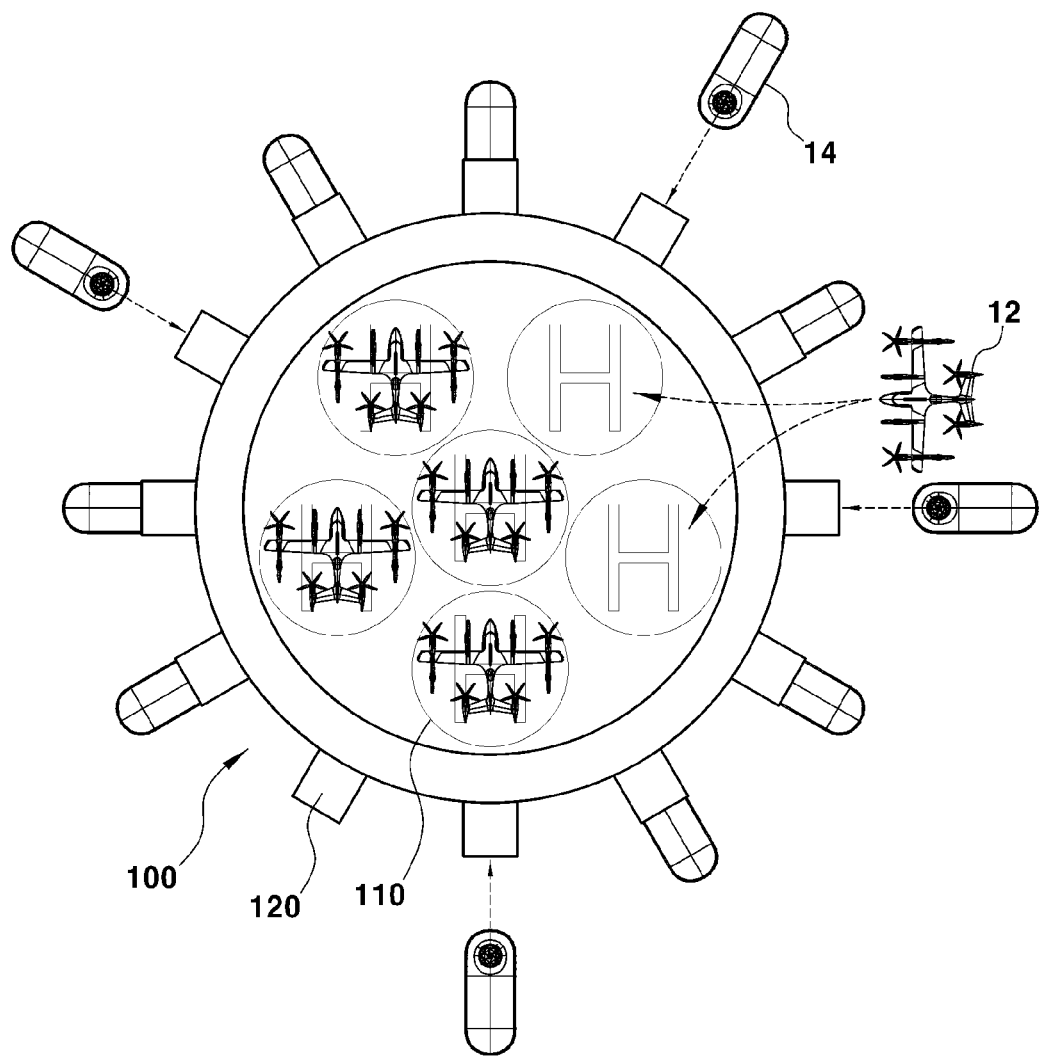
FIG. 1 is a diagram schematically showing an example of a hub to which electrically driven transport vehicles are docked to charge batteries thereof.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 2:
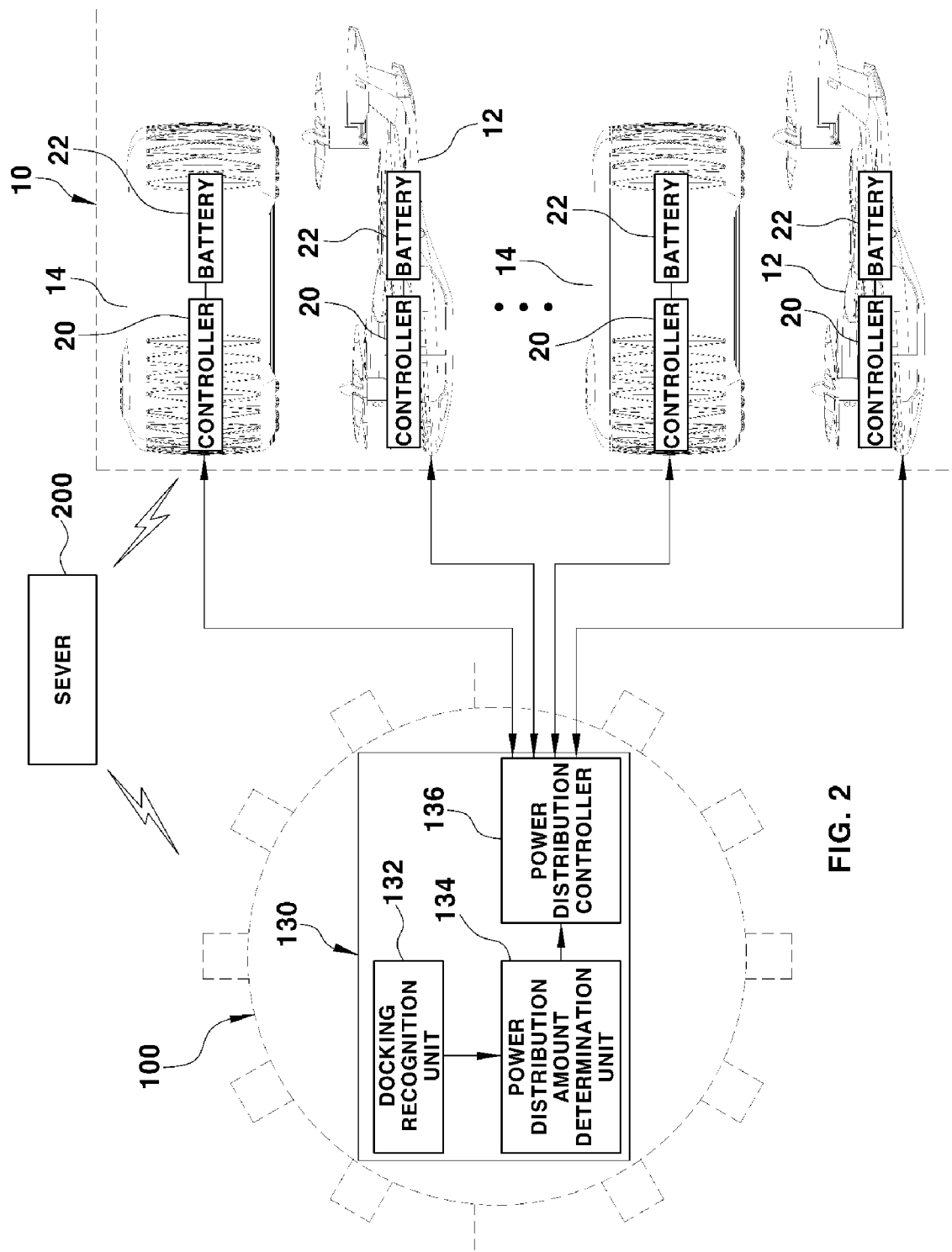
FIG. 2 is a diagram showing the configuration of a charging control system for electrically driven transport vehicles according to the present invention.

FIG. 1 is a diagram schematically showing an example of a hub to which electrically driven transport vehicles are docked to charge batteries thereof, and FIG. 2 is a diagram showing the configuration of a charging control system for electrically driven transport vehicles according to the present invention.

As shown in FIG. 1, a hub 100, which serves as a transfer point and a charging station for electrically driven transport vehicles 10, may be constructed. The electrically driven transport vehicles 10, which include vertical take-off and landing (VTOL) aircraft 12 for urban air mobility (UAM) and purpose-built vehicles (PBVs) 14 for purpose-based mobility, are docked to the hub 100 to charge batteries thereof to travel according to a predetermined schedule. Accordingly, the hub 100 may be equipped with a plurality of vertiports 110 to enable the VTOL aircraft 12 to realize vertical take-off/landing and charging of the batteries thereof and a plurality of charging stands 120 to enable the PBVs 14 to charge the batteries thereof.

Referring to FIG. 2, the hub 100 includes a charging control device 130. The charging control device 130 includes a docking recognition unit 132, a power distribution amount determination unit 134, and a power distribution controller 136. Each of the electrically driven transport vehicles 10 includes a battery 22 and a controller 20 configured to execute charging and discharging of the battery 22.

In addition, the charging control system for electrically driven transport vehicles according to the present invention includes a server 200 for scheduling the travel of each of the electrically driven transport vehicles 10 and managing charging of the battery thereof. The server 200 may be configured to wirelessly communicate with the charging control device 130 of the hub 100 and the controller 20 of each electrically driven transport vehicle.

Accordingly, state variable information for charging of the battery, such as travel schedule information (e.g. the time taken to travel a predetermined route or the next scheduled departure time) and information on the state of charge (SOC) and available energy of the battery, may be transmitted from the controller 20 of each of the electrically driven transport vehicles 10 to the server 200, and may be stored in the server 200.

When the electrically driven transport vehicles 10 are docked to the hub 100 to charge the batteries thereof, that is, when the VTOL aircraft 12 are landed on the vertiports 110 of the hub 100 to charge the batteries thereof and the PBVs 14 are docked to the charging stands 120 of the hub 100 \ to charge the batteries thereof, the charging control device 130 of the hub 100 may be configured to receive state variable information of the electrically driven transport vehicles from the server 200.

The charging control device 130 of the hub 100 may be configured to determine a charging priority with respect to the electrically driven transport vehicles based on the state variable information of the electrically driven transport vehicles, and perform charging control and power distribution control on the electrically driven transport vehicles according to the determined charging priority.

Accordingly, as shown in FIG. 2, the charging control device 130 of the hub 100 may include a docking recognition unit 132 configured to recognize whether the electrically driven transport vehicles have been docked to the hub to charge the batteries thereof, a power distribution amount determination unit 134 configured to determine a battery charging priority with respect to the electrically driven transport vehicles, and a power distribution controller 136 configured to execute charging and discharging of the batteries of the electrically driven transport vehicles according to the battery charging priority. The docking recognition unit 132 may be implemented as a sensor, configured to sense connection of charging units (e.g. charging guns) of the electrically driven transport vehicles to the vertiports 110 and the charging stands 120 of the hub 100.

In response to receiving a docking recognition signal from the docking recognition unit 132, the power distribution amount determination unit 134 may be configured to receive at least one of the plurality of pieces of state variable information of each of the electrically driven transport vehicles 10, stored in the server 200, and compare the plurality of pieces of state variable information of the electrically driven transport vehicles 10 with one another to determine a charging priority or a power distribution amount with respect to the electrically driven transport vehicles docked to the hub 100. According to the charging priority or the power distribution amount determined by the power distribution amount determination unit 134, the power distribution controller 136 may be configured to execute charging of the batteries of the electrically driven transport vehicles, or adjust distribution of power to the electrically driven transport vehicles.

Hereinafter, a charging control method for electrically driven transport vehicles according to the present invention using the charging control system configured as described above will be described with reference to FIGS. 2 and 3.

Figure 3:
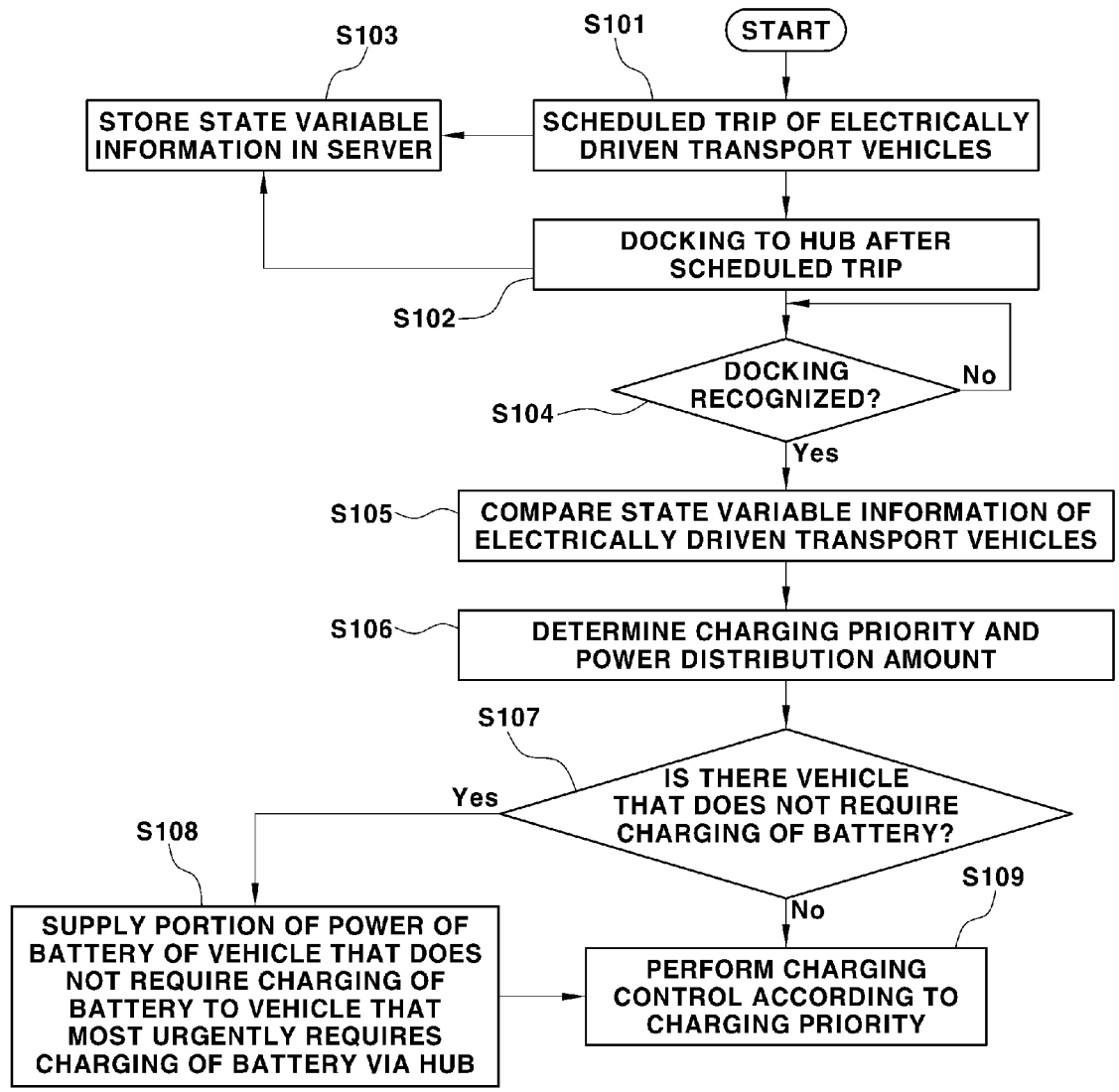
FIG. 3 is a flowchart showing a charging control method for electrically driven transport vehicles according to the present invention.

FIG. 3 is a flowchart showing a charging control method for electrically driven transport vehicles according to the present invention. First, the electrically driven transport vehicle 10 travels according to a predetermined schedule (S101), and is docked to the hub 100 at the end of the scheduled trip (S102). The electrically driven transport vehicle 10 may be configured to transmit state variable information thereof to the server 200 from the time of departure to the time of docking to the hub 100, and the state variable information transmitted to the server 200 may be stored in the server 200 (S103).

In particular, state variable information, which includes information regarding the SOC and available energy of the battery of the electrically driven transport vehicle 10, travel schedule information, and consumed energy information, is wirelessly transmitted from the controller 20 of the electrically driven transport vehicle 10 to the server 200 and is stored in the server 200. At this time, the wireless communication between the controller 20 and the server 200 may be performed by a telematics system included in the electrically driven transport vehicle.

Among the plurality of pieces of state variable information, the travel schedule information may include the travel route of the electrically driven transport vehicle, the departure/arrival time (the time taken to travel a predetermined route), and the next scheduled departure time, the SOC information of the battery includes the SOC of the battery at the time of departure, the SOC of the battery at the time of arrival at the hub, and a change in the SOC of the battery used to travel a predetermined route, and the available energy information may include available energy consumed to travel and remaining available energy at the time of arrival at the hub.

The server 200 may be configured to store data on the state variable information in a buffer memory, and select one representative value using the standard deviation of the data values. For example, assuming that the times taken for the electrically driven transport vehicle to travel a predetermined route are about 15 minutes, 14 minutes, and 16 minutes, one representative time is selected using the standard deviation of the above times. Assuming that the changes in the SOC of the battery used to travel a predetermined route are about 20%, 18%, 19%, and 18%, one representative change in the SOC of the battery is selected using the standard deviation of the above changes. Assuming that the amounts of available energy consumed to travel a predetermined route are about 13 kWh, 12 kWh, and 15 kWh, one representative consumption amount of available energy is selected using the standard deviation of the above consumption amounts.

Subsequently, when the electrically driven transport vehicle 10 is docked to the hub 100, the docking recognition unit 132 of the charging control device 130 of the hub 100 may be configured to recognize whether the electrically driven transport vehicle 10 has been docked to the hub 100 to charge the battery thereof (S104). In response to detecting that the electrically driven transport vehicle 10 has been docked to the hub 100 to charge the battery thereof, the power distribution amount determination unit 134 receives at least one of the plurality of pieces of state variable information of each of the electrically driven transport vehicles from the server 200, perform a comparison between the plurality of pieces of state variable information of the electrically driven transport vehicles docked to the hub (S105), and calculate and determine a charging priority or a power distribution amount with respect to the electrically driven transport vehicles.

In other words, the power distribution amount determination unit 134 may be configured to receive at least one of the plurality of pieces of state variable information of each of the electrically driven transport vehicles 10, stored in the server 200, and determine a charging priority or calculates and determine a power distribution amount with respect to the electrically driven transport vehicles docked to the hub 100. In particular, as shown in Table 1 below, the power distribution amount determination unit 134 may be configured to determine a power distribution amount (a charging/discharging amount) and a charging priority with respect to the electrically driven transport vehicles based on the plurality of pieces of state variable information of each of the electrically driven transport vehicles, specifically, the next scheduled departure time, which is the travel schedule information, the current SOC and available energy of the battery, and the SOC and available energy of the battery required for travel.

TABLE 1

| Electrically Driven Transport Vehicles | Available Energy Required for Travel | Current SOC of Battery | SOC of Battery Required for Travel | Next Scheduled Departure Time |
|---|---|---|---|---|
| $1^{st}$ Vehicle (Electric Bus Having Motor Capacity of 100 kWh) | 80 kWh for 6 Hours | 20% | 80% | In 20 Min. |
| $2^{nd}$ Vehicle (PBV Having Motor Capacity of 70 kWh) | 35 kWh for 4 Hours | 30% | 50% | In 10 Min. |
| $3^{rd}$ Vehicle (UAM Aircraft Having Motor Capacity of 70 kWh) | 35 kWh for 4 Hours | 70% | 50% | In 15 Min. |
| $4^{th}$ Vehicle (Electric Bus Having Motor Capacity of 100 kWh) | 50 kWh for 4 Hours | 100% | 50% | In 12 Min. |

As shown from the state variable information of the electrically driven transport vehicles shown in Table 1 above, the electrically driven transport vehicles that require charging of the batteries to the greatest extent before the next departure are the first electrically driven transport vehicle and the second electrically driven transport vehicle, and the electrically driven transport vehicles that do not require charging of the batteries are the third electrically driven transport vehicle and the fourth electrically driven transport vehicle.

Accordingly, a power distribution amount (a charging/discharging amount) or a charging priority may be determined with respect to the electrically driven transport vehicles based on the state variable information of the electrically driven transport vehicles shown in Table 1 above. For example, the charging priority may be determined according to the following conditions.

$1^{st}$ priority: a vehicle in which the minimum amount of energy required for the next scheduled trip (e.g. the current SOC and available energy of the battery) is insufficient and a vehicle that has a short time to the next scheduled trip.

$2^{nd}$ priority: a vehicle in which the minimum amount of energy required for the next scheduled trip is insufficient and a vehicle that has a long time to the next scheduled trip.

$3^{rd}$ priority: a vehicle that has a sufficient amount of energy (e.g. the current SOC of the battery) but has a short time to the next scheduled trip.

$4^{th}$ priority: a vehicle that has a sufficient amount of energy and has a long time to the next scheduled trip.

The charging of the batteries of the electrically driven transport vehicles may be controlled according to the charging priority determined as described above.

Since the electrically driven transport vehicle to which the fourth priority is given has a high degree of SOC of the battery and has a long time to the next scheduled trip, the power distribution amount determination unit 134 may be configured to determine a power distribution amount such that a portion of the power of the battery of the fourth-priority electrically driven transport vehicle is reversely supplied to the charging control device 130 of the hub 100.

In other words, the charging control device 130 of the hub 100 may be configured to determine a power distribution amount such that, except for the amount of power of the battery required for the next scheduled trip of the fourth-priority electrically driven transport vehicle, the remaining amount of power of the battery is reversely drawn therefrom and supplied to a vehicle that most urgently requires charging of a battery (e.g. the first-priority electrically driven transport vehicle) via the charging control device 130.

Subsequently, whether there is an electrically driven transport vehicle that does not require charging of a battery is determined (S107). In other words, the power distribution controller 136 may be configured to determine whether there is an electrically driven transport vehicle that does not require charging of a battery based on the charging priority determined by the power distribution amount determination unit 134 as described above.

For example, since the fourth-priority electrically driven transport vehicle, which is determined by the power distribution amount determination unit 134, has a high degree of SOC of the battery and has a long time to the next scheduled trip, the power distribution controller 136 may be configured to determine the fourth-priority electrically driven transport vehicle to be a vehicle that does not require charging of a battery. In response to determining in step S107 that there is a vehicle that does not require charging of a battery, power distribution control is performed such that a portion of the power of the battery of the vehicle that does not need to be charged is reversely drawn therefrom and supplied to a vehicle that most urgently requires charging of a battery via the charging control device 130 of the hub 100 (S108).

In other words, the power distribution controller 136 may be configured to perform power distribution control such that, except for the amount of power of the battery required for the next scheduled trip of the vehicle that does not require charging of the battery, the remaining amount of power of the battery is reversely drawn therefrom and supplied to the charging control device 130 of the hub 100, and the power supplied to the charging control device 130 is supplied to a vehicle that most urgently requires charging of a battery (e.g. the first-priority electrically driven transport vehicle).

On the other hand, in response to determining in step S107 that there is no vehicle that does not require charging of a battery, the power distribution controller 136 may be configured to perform charging control on the batteries of the electrically driven transport vehicles according to the charging priority determined by the power distribution amount determination unit 134 (S109). For example, assuming that the charging control device 130 of the hub 100 provides power of about 300 kWh at a rate of about 50 kWh for about 10 minutes, that the remaining time to the next departure and the minimum amount of energy required for the next scheduled trip of the first electrically driven transport vehicle, which is a first-priority vehicle, are, respectively, about 20 minutes and about 60 kWh, and that the remaining time to the next departure and the minimum amount of energy required for the next scheduled trip of the second electrically driven transport vehicle, which is a first-priority vehicle, are, respectively, about 10 minutes and about 14 kWh, the power distribution controller 136 may be configured to perform charging control such that the battery of the second electrically driven transport vehicle is charged with power of about 14 kWh for about 10 minutes, and at the same time, the battery of the first electrically driven transport vehicle is charged with power of about 36 kWh for about 10 minutes.

Subsequently, the power distribution controller 136 may be configured to further perform charging control such that the battery of the first electrically driven transport vehicle is charged with power of about 24 kWh for about 10 minutes, and at the same time, a battery of a lower-priority electrically driven transport vehicle is charged with the remaining amount of power for about 10 minutes. If the batteries of the first-priority and second-priority electrically driven transport vehicles are not completely charged with the power supplied by the charging control device 130 of the hub 100, the charging control device 130 of the hub 100 may be configured to receive power from a lower-priority electrically driven transport vehicle (e.g. the fourth-priority or third-priority electrically driven transport vehicle), and may be configured to supply the received power to the first-priority and second-priority electrically driven transport vehicles.

Preferably, when a vehicle in which a battery does not need to be charged urgently, such as the fourth-priority or third-priority electrically driven transport vehicle, a portion of the power of the battery, other than the amount of power required for the next scheduled trip thereof, is reversely drawn therefrom and supplied to the charging control device 130 of the hub 100. In particular, when the battery of the electrically driven transport vehicle that supplied power to the charging control device 130 of the hub 100 is discharged and thus needs to be charged again, the battery may be charged according to the charging priority in step S109 described above.

As is apparent from the above description, according to the present invention, it is possible to efficiently perform charging control on electrically driven transport vehicles according to a charging priority, which is determined by a charging control device of a hub based on state variables, such as travel schedule information of the electrically driven transport vehicles and the SOC and available energy of batteries thereof.

In addition, power distribution between electrically driven transport vehicles is adjusted by a charging control device of a hub based on state variables, such as travel schedule information of the electrically driven transport vehicles and the SOC and available energy of batteries thereof, thereby achieving efficient charging of the batteries of the electrically driven transport vehicles, which travel according to a schedule, and optimization of travel of the vehicles.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A charging control system for electrically driven transport vehicles, comprising:
   a battery and a controller mounted in each of the electrically driven transport vehicles;
   a charging control device of a hub to which the electrically driven transport vehicles are docked to charge batteries thereof; and
   a server configured to store at least one of a plurality of state variable information of the electrically driven transport vehicles, provided from the controller, and to provide the stored state variable information to the charging control device of the hub;
   wherein the charging control device of the hub is configured to determine a charging priority for the electrically driven transport vehicles based on the state variable information thereof, and perform charging control or power distribution control;
   wherein the plurality of state variable information includes travel schedule information of the electrically driven transport vehicles, information on a state of charge (SOC) of the batteries, and information on available energy of the batteries;

wherein the charging control device is configured to compare the plurality of pieces of state variable information to determine charging priority or power distribution amount for the electrically driven transport vehicles, and wherein the charging control device of the hub is configured to determine the charging priority based on a time to the next scheduled trip when a vehicle in which the minimum amount of energy required for the next scheduled trip is insufficient.

2. The charging control system of claim 1, wherein the charging control device includes:
   a docking recognition unit configured to recognize whether the electrically driven transport vehicles have been docked to the hub to charge the battery;
   a power distribution amount determination unit configured to determine the charging priority for the electrically driven transport vehicles; and
   a power distribution controller configured to execute charging and discharging of the battery of the electrically driven transport vehicles according to the charging priority.

3. The charging control system of claim 2, wherein, the docking recognition unit is implemented as a plurality of sensors configured to sense whether charging units of the electrically driven transport vehicles have been docked to the hub to charge the batteries.

4. The charging control system of claim 2, wherein the power distribution controller is configured to execute charging of each of the batteries of the electrically driven transport vehicles, or adjust distribution of power to the electrically driven transport vehicles according to the charging priority or the power distribution amount determined by the power distribution amount determination unit.

5. A charging control method for electrically driven transport vehicles, comprising:
   docking an electrically driven transport vehicles to a charging control device of a hub to charge a batteries of the electrically driven transport vehicles;
   transmitting state variable information of the electrically driven transport vehicles to a server from departure to docking on the hub and storing the state variable information in the server;
   determining, by the charging control device, a charging priority or a power distribution amount for the electrically driven transport vehicles based on the state variable information provided from the server; and
   performing, by the charging control device, control of charging of the batteries of the electrically driven transport vehicles or control of distribution of power to the electrically driven transport vehicles according to the determined charging priority or the determined power distribution amount;

wherein the state variable information includes:
   travel schedule information comprising travel route of the electrically driven transport vehicles, a departure time, an arrival time, and a next scheduled departure time;
   state of charge (SOC) information of the batteries including the SOC of the batteries at departures, the SOC of the batteries at arrivals at the hub, and changes in the SOC of the batteries used to travel predetermined routes; and
   available energy information comprising available energy consumed to travel and remaining energy at arrivals at the hub:
wherein the charging control device is configured to determine a charging priority based on a time to the next scheduled trip when a vehicle in which the minimum amount of energy required for the next scheduled trip is insufficient.

6. The charging control method of claim 5, wherein the server is configured to store data on the state variable information, and select one representative value using a standard deviation of the data.

7. The charging control method of claim 5, further comprising:
   recognizing, by the charging control device, whether the electrically driven transport vehicles have been docked on the charging control device to charge the batteries before determining the charging priority or the power distribution amount.

8. The charging control method of claim 5, wherein controlling distribution of power to each of the electrically driven transport vehicles includes:
   determining whether there are any one or more that do not require charging of batteries among the electrically driven transport vehicles; and
   in response to determining that there are any one or more that do not require charging of batteries, performing charging control such that a portion of power of the batteries of the vehicles that do not require charging of the batteries is supplied to vehicles that most urgently require charging of batteries via the charging control device.

9. The charging control method of claim 8, wherein, among the plurality of electrically driven transport vehicles, a vehicle that has a relatively high degree of SOC of a battery and has a relatively long time to a next scheduled trip is determined to be the vehicle that does not require charging of the battery.

10. The charging control method of claim 8, wherein, when the battery of the vehicle that supply power to another vehicle via the charging control device is discharged and requires an additional charge, the battery is charged according to the charging priority.

* * * * *